April 11, 1939.   W. A. BRECHT ET AL   2,154,262
ELECTRIC VEHICLE TRUCK
Filed Oct. 16, 1936    2 Sheets-Sheet 1

WITNESSES:

INVENTORS.
Winston A. Brecht and
Frank L. Alben.
BY
ATTORNEY

Patented Apr. 11, 1939

2,154,262

UNITED STATES PATENT OFFICE 2,154,262

ELECTRIC VEHICLE TRUCK

Winston A. Brecht and Frank L. Alben, Pittsburgh, Pa., assignors to Westinghouse Electric & Manufacturing Company, East Pittsburgh, Pa., a corporation of Pennsylvania Application October 16, 1936, Serial No. 105,938

7 Claims. (Cl. 105—195)

Our invention relates, generally, to truck structures and particularly to trucks for electrically driven railway vehicles.

An object of our invention, generally stated, is to provide a railway vehicle truck structure which shall be simple and efficient in operation and which may be economically manufactured and installed.

A more specific object of our invention is to provide for uniform loading on the axles of a six-wheel truck for electrically propelled vehicles.

Another object of our invention is to provide a large amount of vertical flexibility in a railway vehicle truck.

Other objects of our invention will be explained fully hereinafter or will be apparent to those skilled in the art.

According to one embodiment of our invention, the journal boxes on the outer axles of a six-wheel truck are of the "wing" type with guides operating in an oil bath, which reduces the friction damping to a minimum. The wing journal boxes are each loaded by a coil spring in parallel with a semi-elliptic spring, one end of which rests on top of a portion of the journal box. The other end of the semi-elliptic spring rests on the journal box of the middle axle in such a way that the spring acts as an equalizer. In this manner, the truck frame is so disposed on the semi-elliptic springs and the coil springs in the wing journal boxes that the weight on the truck is equally divided between the three axles.

For a fuller understanding of the nature and objects of our invention, reference may be had to the following detailed description taken in conjunction with the accompanying drawings, in which.

Figure 1:
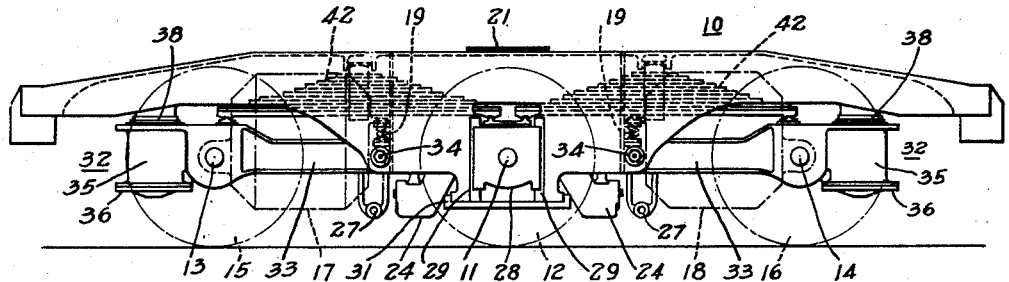
Figure 1 is a view, in side elevation, of a railway vehicle truck embodying our invention.
Figure 2:
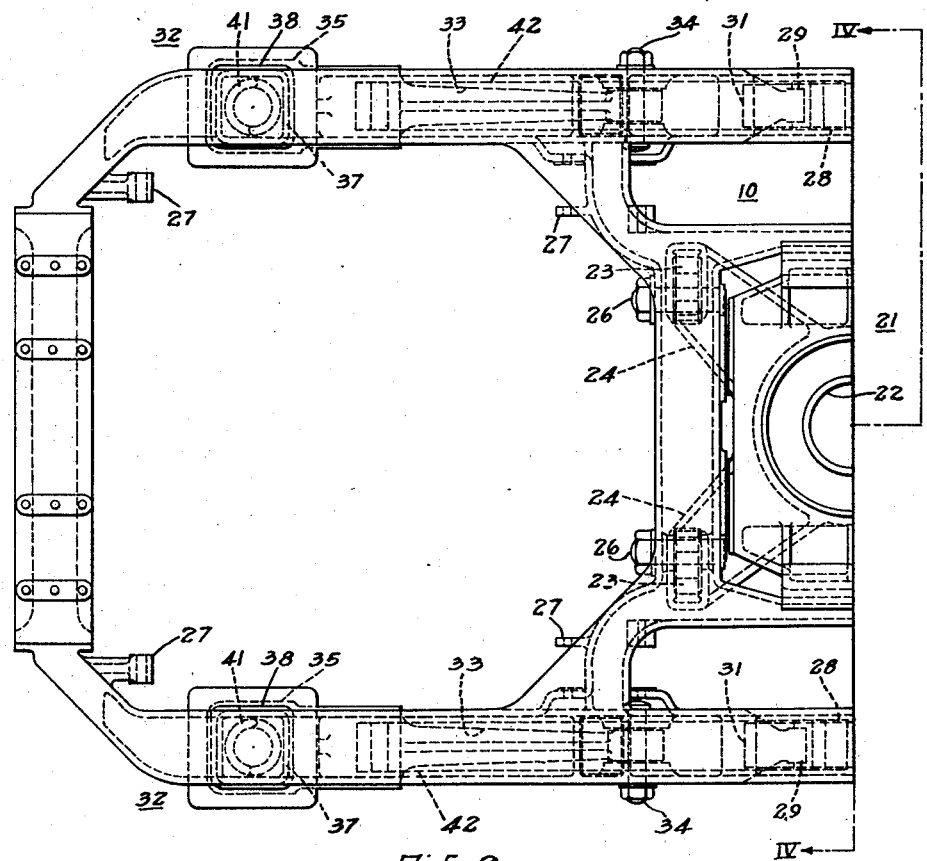
Fig. 2 is an enlarged view, in plan, of one-half of the truck structure shown in Fig. 1.

Referring to the drawings, particularly to Fig. 1, the vehicle truck shown therein comprises a frame 10 which is supported by a center axle 11, having wheels 12, and two outer axles 13 and 14 having wheels 15 and 16, respectively. The outer axles 13 and 14 are provided with electric motors 17 and 18, respectively, for propelling the truck. As shown, one side of each motor may be mounted on the axle which it drives and the other side resiliently supported in the frame 10 by means of springs 19, in a manner well known in the art.

Figure 3:
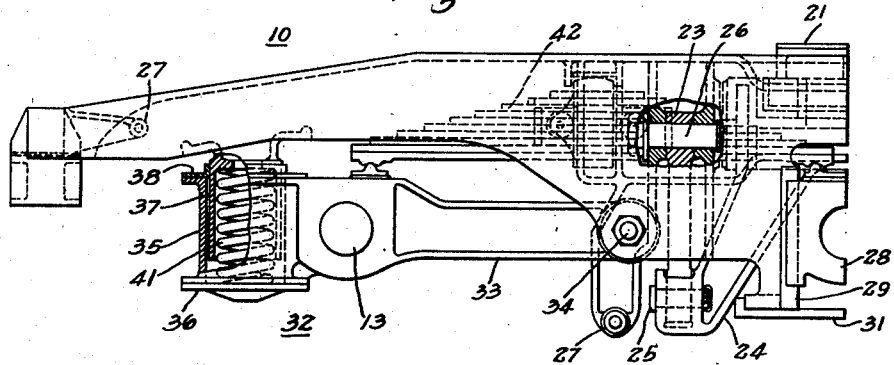
Fig. 3 is an enlarged view, in side elevation, of one-half of the truck structure, portions being cut away for clearness.
Figure 4:
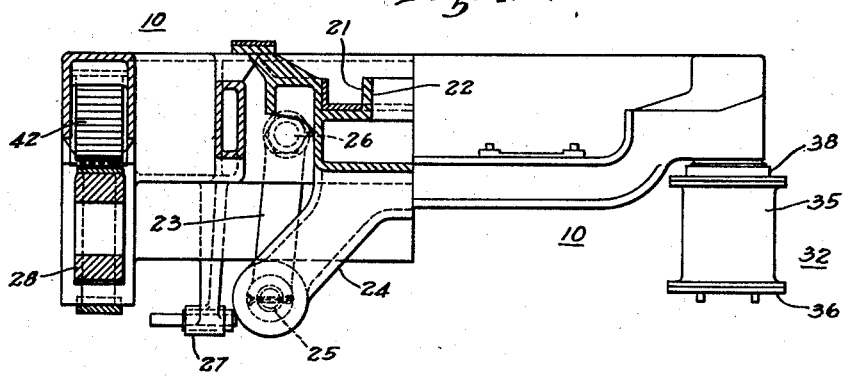
Fig. 4 is a view, partially in section and partially in end elevation, taken along the line IV—IV of Fig. 3.

In order to provide lateral flexibility, a bolster 21, which is provided with an opening 22 for receiving a truck center pin, is carried by four swing links 23, as shown more clearly in Figs. 3 and 4. The bolster 21 is provided with four downwardly and outwardly extending arms 24, one at each corner of the bolster, to which the lower ends of the swing links 23 are attached by means of pins 25. The upper ends of the swing links are pivotally secured in the truck frame by pins 26.

The truck frame 10 is also provided with a number of arms 27 for mounting a suitable brake rigging on the truck. Since the brake rigging forms no part of the present invention, it has been omitted from the drawings in order to avoid unduly complicating the structure illustrated.

In order to provide for vertical movement of the center axle 11 in the truck frame, it is supported by the usual journal box 28 which is slidably mounted in the frame between pedestal jaws 29. A suitable plate 31 is secured across the bottom of the jaws 29 to limit the downward movement of the journal box 28.

With a view to permitting substantially vertical movement of the outer axles 13 and 14, the journal boxes 32, which support the outer axles are attached to the truck frame 10 by horizontally disposed arms 33 which are pivotally secured in the frame by means of pins 34. In this manner, the arms 33 are permitted to oscillate about their pivot points 34, which permits the outer axles to move up and down independently of the center axle as the truck passes over irregularities in the track, thereby affording extreme flexibility in the truck structure and improving its riding qualities.

The journal boxes 32 for the outer axles are of the wing type and each one is provided with a hollow member 35, which is closed at the bottom by a plate 36 to constitute an oil tight chamber, as shown in Fig. 3. A similar member 37 is secured to the under side of the frame 10 and is disposed inside of the member 35 to serve as a guide member for the journal box. It will be noted that sufficient clearance is provided between the members 35 and 37 to permit movement of the axles about their pivot points. Oil may be placed in the chamber 35 to reduce the friction between the guide members. A flanged ring 38 may be placed around the member 37 on top of the member 35 to retain the oil in the cylinder.

As shown, the wing journal boxes are each loaded by a coil spring 41 in parallel with a semi-elliptic spring 42. The coil spring is disposed inside of the members 35 and 37 to partially support the frame 10 and one end of the semi-elliptic spring rests on top of that portion of the journal box which surrounds the axle. The other end of the semi-elliptic spring rests on top of the journal box for the center axle and the truck frame 10 rests on the semi-elliptic spring substantially midway between the two axles.

Thus it will be seen that the semi-elliptic springs function as equalizers between the outer and the center axles. Furthermore, the coil springs 41 are so disposed in the wing journal boxes on the outer axles that they carry a portion of the load on the frame 10, thereby effecting an equal distribution of the load between the outer and the center axles. This combination of springs results in uniform axle loading, large vertical flexibility, and in a reduced amount of friction damping.

From the foregoing description it is apparent that we have provided a six-wheel railway vehicle truck which is simple and efficient in operation and which is particularly suitable for electrically propelled vehicles which operate at relatively high speeds because of the large amount of flexibility and improved riding qualities of the truck.

We do not desire to be restricted to the specific embodiment of the invention herein shown and described, since it is evident that it may be changed and modified without departing from the spirit and scope of our invention as defined in the appended claims.

We claim as our invention:

1. In a railway vehicle truck having three axles, in combination, a truck frame, journal boxes for supporting said axles, means for mounting the journal boxes for the center axle in the truck frame to permit vertical movement of said axle, horizontally disposed arms for pivotally connecting the outer axles to the truck frame, spring means extending between the journal boxes on the outer axles and the journal boxes on the center axle for supporting the truck frame and functioning as partial equalizers between the outer and the center axles, and additional spring means disposed at the sides of the outer axles opposite the pivot connections of said horizontal arms to cooperate with said first named spring means in supporting the truck frame.

2. In a railway vehicle truck having three axles, in combination, a truck frame, journal boxes for supporting said axles, means for mounting the journal boxes for the center axle in the truck frame to permit vertical movement of said axle, horizontally disposed arms for pivotally connecting the outer axles to the truck frame, spring means extending between the journal boxes on the outer axles and the journal boxes on the center axle for partially supporting the truck frame and functioning as partial equalizers between the outer and the center axles, and additional spring means disposed between the journal boxes on the outer axles and the truck frame and cooperating with said first named spring means in supporting the truck frame.

3. In a railway vehicle truck having three axles, in combination, a truck frame, journal boxes for supporting said axles, means for mounting the journal boxes for the center axle in the truck frame to permit vertical movement of said axle, horizontally disposed arms for pivotally connecting the outer axles to the truck frame, horizontally disposed spring means extending between the journal boxes on the outer axles and the journal boxes on the center axle for partially supporting the truck frame and functioning as partial equalizers between the outer and the center axles, and additional spring means vertically disposed in the journal boxes on the outer axles for assisting the horizontally disposed springs in the support of the truck frame.

4. In a railway vehicle truck having three axles, in combination, a truck frame, journal boxes for supporting said axles, means for mounting the journal boxes for the center axle in the truck frame to permit vertical movement of said axle, horizontally disposed arms for pivotally connecting the outer axles to the truck frame, horizontally disposed spring means extending between the journal boxes on the outer axles and the journal boxes on the center axle, the truck frame resting on said springs substantially midway between said axles, whereby said springs function as partial equalizers between said axles, and additional spring means disposed in the journal boxes on the outer axles for assisting the horizontally disposed springs in the support of the truck frame.

5. In a railway vehicle truck having three axles, in combination, a truck frame, journal boxes for supporting said axles, means for mounting the journal boxes for the center axle in the truck frame to permit vertical movement of said axle, horizontally disposed arms for pivotally connecting the outer axles to the truck frame, semi-elliptic springs for partially supporting the truck frame, one end of each spring resting on a journal box for an outer axle and the other end resting on a journal box for the center axle with the truck frame resting on the spring substantially midway between said axles, whereby said springs function as partial equalizers between said axles, and coil spring disposed in the journal boxes for the outer axles to assist the semi-elliptic springs in supporting the truck frame.

6. In a railway vehicle truck having three axles, in combination, a truck frame, journal boxes for supporting said axles, means for mounting the journal boxes for the center axle in the truck frame to permit vertical movement of said axle, horizontally disposed arms for pivotally connecting the outer axles to the truck frame, semi-elliptic springs for partially supporting the truck frame, one end of each spring resting on a journal box for an outer axle and the other end resting on a journal box for the center axle with the truck frame resting on the spring substantially midway between said axles, whereby said springs function as partial equalizers between said axles and coil springs disposed in the journal boxes for the outer axles to assist the semi-elliptic springs in supporting the truck frame, said coil springs being disposed to increase the loading on the outer axles whereby the outer and the inner axles are loaded uniformly.

7. In a railway vehicle truck having three axles, in combination, a truck frame, journal boxes for supporting said axles, means for mounting the journal boxes for the center axle in the truck frame to permit vertical movement of said axle, horizontally disposed arms for pivotally connecting the outer axles to the truck frame, spring means horizontally extending between the tops of adjacent journal boxes for partially supporting the frame and functioning as partial equalizers between the outer and the inner axles, and additional spring means disposed at the sides of the outer axles opposite the pivot connections of said horizontal arms to cooperate with said horizontal springs in supporting the truck frame.

WINSTON A. BRECHT.
FRANK L. ALBEN.